United States Patent [19]

Lenhart

[11] Patent Number: 4,655,677
[45] Date of Patent: Apr. 7, 1987

[54] METHOD FOR HANDLING CONTAINER ENDS EN MASSE

[75] Inventor: Ronald A. Lenhart, Lakewood, Colo.

[73] Assignee: Precision Metal Fabricators, Inc., Arvada, Colo.

[21] Appl. No.: 809,038

[22] Filed: Dec. 16, 1985

[51] Int. Cl.⁴ .................. B65G 51/02; B65G 59/10
[52] U.S. Cl. .................................... 414/786; 198/836; 406/88; 414/28; 414/112; 414/676
[58] Field of Search .............. 414/28, 30, 105, 112, 414/116, 676, 786; 406/88, 89, 181, 197; 198/836

[56] References Cited

U.S. PATENT DOCUMENTS

| | | |
|---|---|---|
| 1,149,595 | 8/1915 | Pipe et al. ........................... 414/116 |
| 3,391,658 | 7/1968 | Williams ........................ 198/836 X |
| 3,545,631 | 12/1970 | Mojden et al. . |
| 3,685,632 | 8/1972 | Brady ..................................... 406/88 |
| 3,685,671 | 8/1972 | Layman . |
| 3,731,823 | 5/1973 | Goth . |
| 3,978,971 | 9/1976 | Conrow et al. ................. 198/836 X |
| 4,347,022 | 8/1982 | Lenhart ................................. 406/88 |
| 4,500,229 | 2/1985 | Cole et al. ............................ 406/88 |
| 4,561,806 | 12/1985 | Lenhart ................................. 406/88 |

Primary Examiner—Leslie J. Paperner
Attorney, Agent, or Firm—Fields, Lewis, Pittenger & Rost

[57] ABSTRACT

A method is provided for conveying container ends en masse wherein the container ends are first placed in stacks of substantially equal height. These stacks are conveyed by conventional air conveying means through an accumulator which includes air mass conveyor table which has a top cover spaced above the top of the stacks of container ends at a height which is less than the overlap of the nested container ends so that the container ends remain in their respective stacks when subjected to lateral forces. These container end stacks can be brought into single file by air conveying single filing technology at the outlet of the accumulator.

5 Claims, 5 Drawing Figures

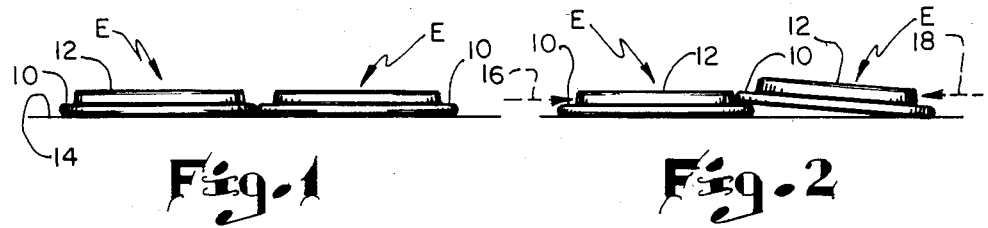
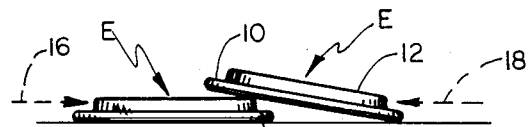
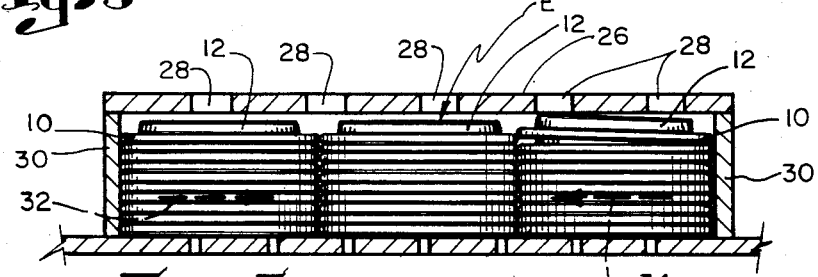
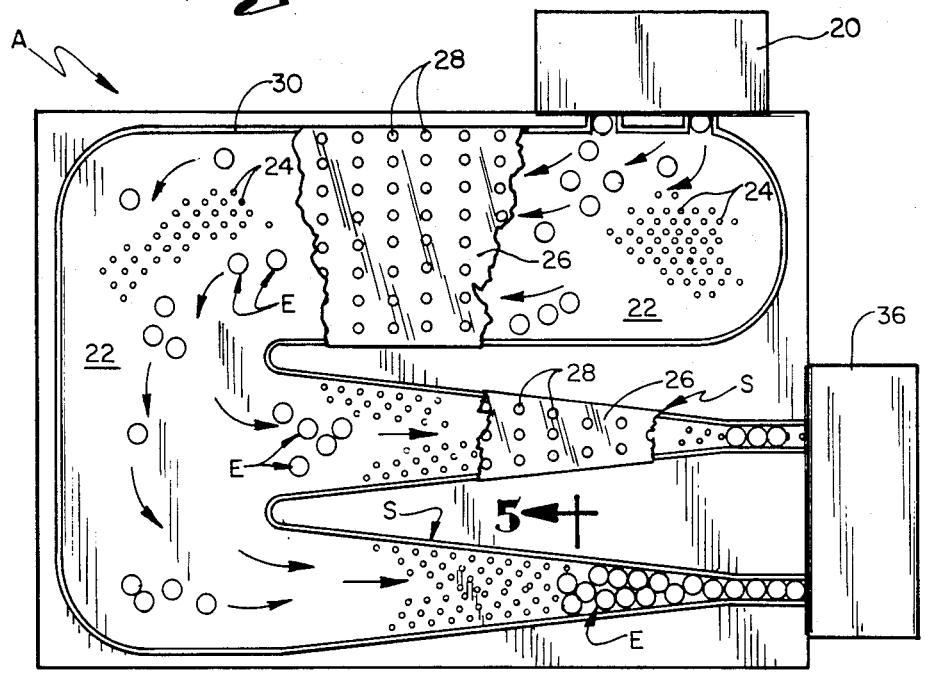

METHOD FOR HANDLING CONTAINER ENDS EN MASSE

TECHNICAL FIELD

This invention relates to a method of handling container ends or shells in an accumulator and more particularly to a method of handling them in nested stacks which are received en masse and placed in single file.

BACKGROUND ART

A number of devices are known in the prior art for stacking and downstacking container ends in a manufacturing plant. One such device for accomplishing both functions is shown in U.S. Pat. No. 3,545,631 to Mojden for "Can End Transfer Apparatus". Such apparatus is suitable for its intended purpose, namely, to arrange individual container ends into a stack or to arrange the stack into individual container ends on a transfer belt. However, such devices are not suitable where means for accumulating container ends is required between two work stations to accommodate stoppages and surges in the supply of container ends or in the utilization thereof. A particular situation where an accumulator is needed is between the shell press and the liners and between the liners and the conversion press in a container end manufacturing plant. The problem in handling individual container ends is that the rolled over peripheral edge has a very small radius and adjacent container ends tend to ride up on each other if there is any lateral force pushing them together. It can be understood that if a number of such container ends are placed in individual side by side relationship on a conveyor and any lateral pressure is exerted against them, they will become interlayed with each other and difficult, if not impossible, to handle in any predetermined, predictable fashion.

U.S. Pat. No. 3,685,671 to Layman for "Stacking Lightweight Plastic Articles" shows apparatus using air jets for stacking plastic trays. U.S. Pat. No. 3,731,823 to Goth for "Wafer Transport System" shows a device for stacking semiconductor wafers.

Apparatus for arranging containers, such as aluminum or steel cans, into single file is shown in my copending U.S. Patent application Ser. No. 533,225, filed Sept. 19, 1983 for "Vertical Single Filer Conveyor System", now Pat. No. 4,561,806 . While this apparatus is entirely suitable for handling containers, it cannot handle individual container ends in side by side relationship because the lateral forces exerted by the converging side walls will cause them to ride up on each other.

DISCLOSURE OF THE INVENTION

In accordance with this invention a method of conveying a plurality of nestable disks from a first supplying station to a using second station, wherein each disk has a peripheral lip, which lies in a plane and has a depth, and a central portion which is offset from the plane to form a raised portion on one side and a hollow portion on the opposite side so that the raised portion of one disk will be received in the hollow portion of the next disk. Thus, the disks are nested in a stack to lock them in place with respect to relative lateral movement. The method includes arranging the disks in a plurality of stacks of substantially equal height, transferring the stacks en masse by means of an air mass conveyor, supplying the stacks en masse to the inlet of a vertical single filer, converging the stacks through this single filer by means of air to arrange them in single file, providing means to restrict upward movement of the disks in each stack to a distance which is less than the depth of the raised portion of each disk to prevent lateral displacement of adjacent disks in each stack, and discharging these stacks in single file. Subsequently, the single file of stacks can be downstacked.

It will be understood that by arranging the disks in a plurality of stacks wherein the upward movement of any disk in the stack is limited to a movement of less than the nesting depth of the stacks, that adjacent stacks can engage each other with substantial lateral force and will not become interlayed with each other and therefore can be transported in much the same way as cylindrical containers can be transferred by use of mass air conveyors and air single filers. Thus, an air table can be used as an accumulator to collect a large number of container ends and move them en masse and into single file by means of air conveying equipment and maintain them in an organized fashion for subsequent use.

Additional advantages of this invention will become apparent from the description as follows, taken in conjunction with the accompanying drawings.

BRIEF DESCRIPTION OF THE DRAWINGS

FIG. 1 is a side elevation showing two container lids in abutting relationship;

FIG. 2 is a side elevation, similar to FIG. 1, but showing the lip of one container end riding over the lip of the next container end as a result of forces urging the container ends toward each other;

FIG. 3 is a side elevation, similar to FIGS. 1 and 2, but showing one container end riding clear up onto the top of the adjacent container end;

FIG. 4 is a plan view, with parts broken away for clarity of illustration, of an accumulator for accumulating stacks of container ends and handling them in accordance with this invention between a stacker and downstacker; and FIG. 5 is a horizontal section, taken along line 5—5, of FIG. 4 showing the handling of stacks of containers in accordance with this invention.

BEST MODE FOR CARRYING OUT THE INVENTION

In accordance with this invention a method is provided wherein container ends can be accumulated between a first supplying station and a second using station when the supplying station is supplying container ends faster than the using station can use them. Also, the accumulator can supply the container ends which have been accumulated to the using station as needed and when the supplying station is not supplying container ends as fast as the using station is using them. Typically, the supplying station is a shell press and the using station includes liners. The container ends can then be supplied by the liners to a third station, such as a conversion press. Another accumulator can be used between the liners and the conversion press.

FIG. 1 shows a pair of container ends E. These container ends are in the shape of a disk and have a peripheral planar rolled edge 10 and an offset center portion 12. The depth of the center portion 12 from the lip 10 makes it possible for the container ends E to nest, one on top of the other. However, when they are resting flat on a surface, as in FIG. 1, and a lateral pressure is exerted, as shown by arrows 16 and 18, the lip 10 of one container end E will tend to ride up on the lip of the other container end E because of the small radius of the edges 10. If this force continues to be applied, as shown in FIG. 3, one container end will ride clear up onto the other container end. Thus, it can be seen that it is virtually impossible to utilize air conveying means or mechanical means for transporting individual container ends en masse from one point to another and to bring them into single file in a single filer having converging side walls. The converging side walls exert lateral forces on the container ends to narrow the stream of container ends down to single file.

It has been found that if the container ends are stacked in a plurality of equal stacks that they can be handled by air conveying means much in the same way as empty containers can be handled so long as the stacks of container ends are restrained so that they cannot move upwardly with respect to each other a sufficient distance as to become unnested.

To accomplish this method, an accumulator A is provided, as shown in FIG. 4, to which stacks of nested container ends of substantially equal height are provided by a conventional stacker 20. The stacker is supplied with container ends from another apparatus, not shown, such as a shell press. The stacks of container ends are provided to an air table 22 en masse. Air is supplied to the air table from a plenum through a plurality of air jets 24. The air jets are angled so as to direct the stacks of container ends in the direction in which they are intended to move. A cover 26 is provided over the air table and has a plurality of openings 28 for allowing air from the air jets to escape. Conveniently, the cover is supported by side rails 30 which define the periphery of the table. The stacks of container ends are supplied to single filers, such as vertical single filers S, shown in FIG. 4. These may be of any suitable construction but a form which has been found to be quite satisfactory is that shown in my above-identified U.S. Patent application Ser. No. 533,225, filed Sept. 19, 1983. As the stacks of container ends move into the single filer, they will be urged toward one another by lateral forces exerted by the side rails as identified by force arrows 32 and 34, shown in FIG. 5. As will be apparent from viewing FIG. 5, because of the placement of cover 26, the container ends E cannot ride up on top of one another because they will engage the top before edge 10 of one container end can ride up onto edge 10 of an adjacent container end. Thus, the stacks of container ends can be handled just like containers in my above-mentioned pending application and therefore fed into single file into a downstacker 36. The downstacker can provide the container ends to another apparatus (not shown), such as several liners for applying a liner layer to the container ends.

A typical container end or shell weighs approximately 3.5 grams and has a height of 0.260 inches, the flange being 0.080 inches high and the offset center portion being 0.180 inches high. A stack of 10 container ends weighs approximately 35 grams and can be conveyed on an air table and through a single filer as defined in this invention.

By way of example and not limitation, for handling container ends in stacks of 10 it has been found that the air jet openings 24 and the mass air table 22 should have a diameter of 5/64th inches and be angled at 15° from the perpendicular and in the direction of travel. The air jets in the single filer S should be 5/64ths inches in diameter and angled at 40° from the perpendicular in the direction of travel. Over the mass air conveyor 22, the spacing of holes 28 in cover 26 can be 1⅜ths inches on centers in the direction of travel and 2 inches on centers across the air table. This gives an open area of approximately 18 percent but this can satisfactorily be reduced to approximately 10 percent open area. The covers in the single file area can be provided as described in my above-mentioned copending application. A stack of 10 container ends has a height of about 0.925 inches and a clearance above the stack of no more than 0.115 inches should be provided. Thus, the total height of the cover above the surface of the table should not exceed 1.040 inches, but could be as little as 1.035 inches. This structure will prevent the container ends from becoming unnested. It will be understood that should an occasional stack be less than ten, the container ends are not likely to become separated since the taller stacks around the short stack tend to keep the container ends aligned on the short stack.

From the foregoing, the advantages of this invention are readily apparent. A method has been provided for handling container ends en masse without the attendant problem of them riding up on each other when subjected to lateral pressure. In this regard, the method includes arranging the container ends in stacks of substantially equal height and conveying them by mass air conveying means and providing a top cover over them which limits the upward movement of the container ends so that they cannot ride up over each other. When in this arrangement, the container ends can be handled en masse and converted to a single file arrangement through the use of conventional technology, thereby providing an accumulator for use between apparatus, such as a shell press and liners, wherein the shell press and the liners operate at different operating speeds and sometimes intermittently.

This invention has been described in detail with reference to a particular embodiment thereof, but is will be understood that various other modifications can be effected within the spirit and scope of this invention.

What is claimed is:

1. A method of conveying a plurality of nestable disks from a first supplying station to a second using station, wherein each disk has a peripheral lip, which lies in a plane and has a depth, and a central portion which is offset from the plane to form a raised portion on one side and a hollow portion on the opposite side so that the raised portion of one disk will be received in the hollow portion of the next disk so that they are nested in a stack to lock them in place with respect to relative lateral movement, said method comprising the steps of:
   arranging the disks in a plurality of stacks of substantially equal height;
   transferring the stacks en masse by means of an air mass conveyor;
   supplying the stacks en masse to the inlet of a vertical single filer;
   conveying said stack through the single filer by means of air to arrange them in single file;
   providing means to restrict upward movement of disks in each stack to a distance which is less than the depth of the raised portion of each disk to prevent lateral displacement of adjacent disks in each stack; and
   discharging the stacks in single file.

2. A method, as claimed in claim 1, including the further step of:
   sequentially down stacking the single file stacks.

3. A method of conveying a mass of nestable disks from an upstream station to a downstream station wherein each disk has a peripheral, planar rolled edge which will tend to cause one unrestricted disk to ride up upon another unrestricted disk when lateral forces urge the disks into contact with each other, each disk having an offset center portion having sufficient depth so that the disks are nestable in a stack, said method comprising the steps of:

nesting the disks in a plurality of stacks of substantially equal height;

air conveying the stacks from the upstream location to the downstream location through a pair of converging side rails to bring the stacks into single file at the downstream end; and limiting the upward movement of any disk in each stack to an amount less than the nesting depth of the disks.

4. A method, as claimed in claim 3, wherein the disks are container lids.

5. A method, as claimed in claim 3, including the further step of:

transferring the plurality of stacks en masse by means of an air mass conveyor to the upstream location.

* * * * *